Oct. 16, 1923. 1,471,302
H. C. WRIGHT ET AL
MANURE REMOVER AND SPREADER
Original Filed Aug. 11, 1921 3 Sheets-Sheet 3
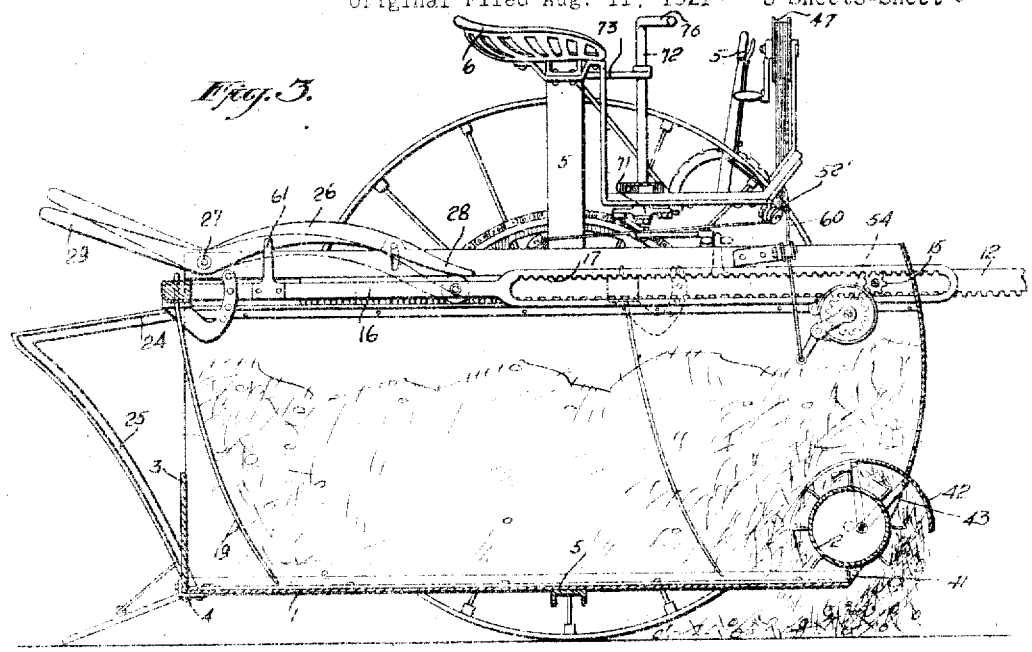
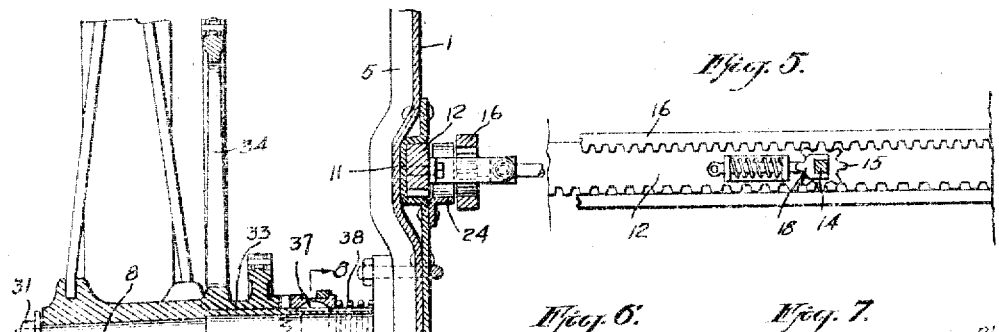
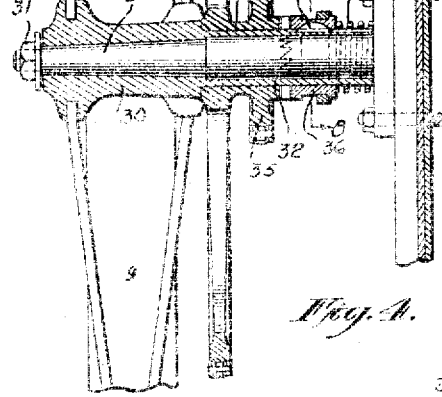
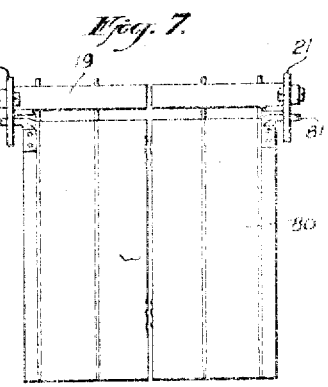
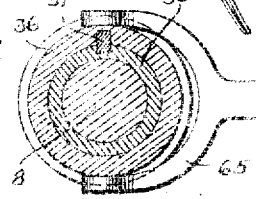
INVENTORS
H. C. Wright
W. J. Wright
BY
ATTORNEYS Patented Oct. 16, 1923.

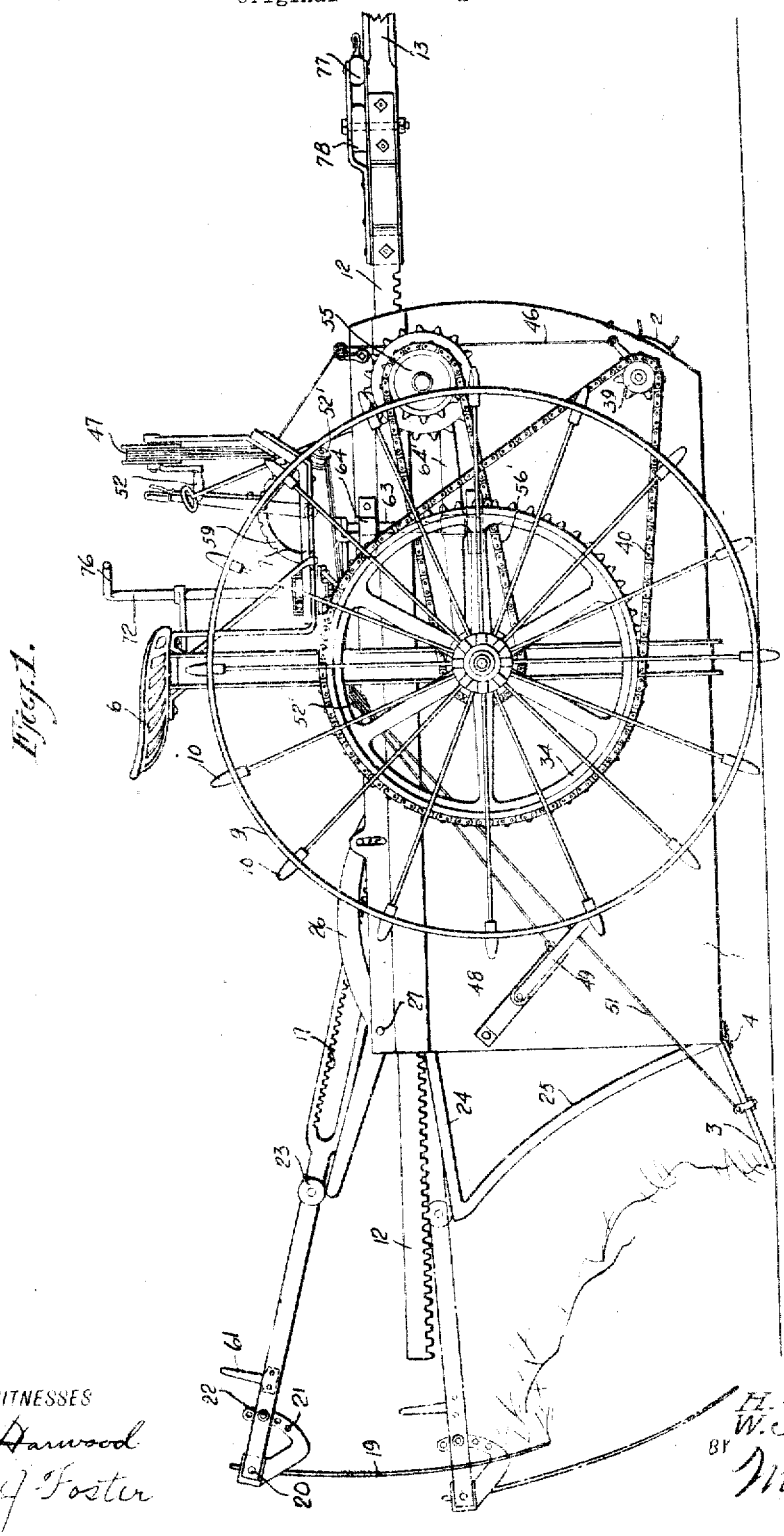

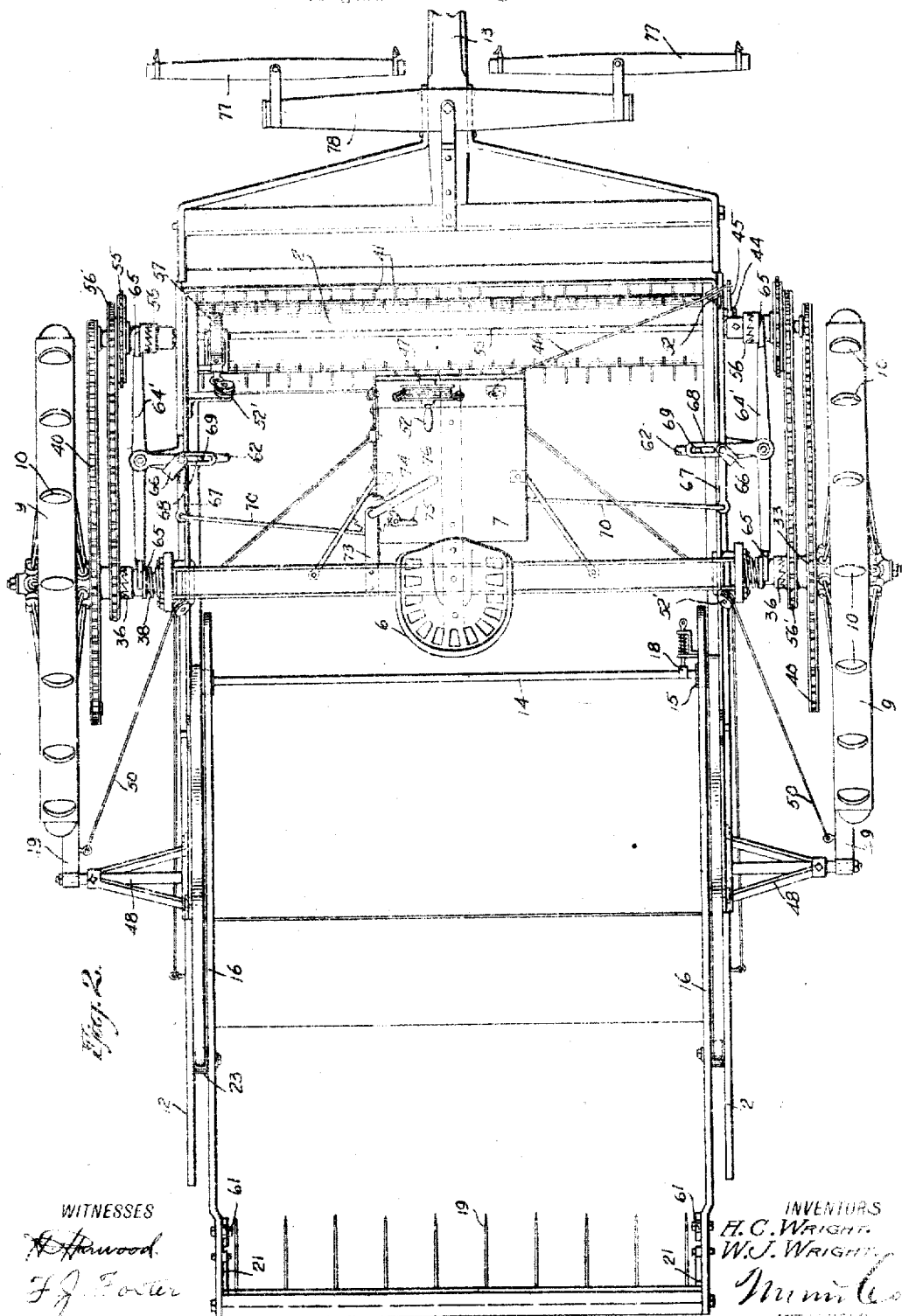

1,471,302

UNITED STATES PATENT OFFICE.

HERBERT CARSWELL WRIGHT AND WILLIAM JOHN WRIGHT, OF OAK LAKE, MANITOBA, CANADA.

MANURE REMOVER AND SPREADER.

Application filed August 11, 1921, Serial No. 491,413. Renewed July 12, 1923.

*To all whom it may concern:*

Be it known that we, HERBERT C. WRIGHT and WILLIAM J. WRIGHT, citizens of the Dominion of Canada, and residents of Oak Lake, Manitoba, Canada, have invented a new and Improved Manure Remover and Spreader, of which the following is a full, clear, and exact description.

This invention relates to improvements in an apparatus for removing and spreading manure, an object of the invention being to provide a device of this character equipped with a novel mechanism for loading manure and also with a novel mechanism for spreading manure and feeding the same to the spreader.

Another object is to provide a device of this character in which the traction wheels automatically operate the feeding mechanism, and to provide improved means for throwing the traction wheels and feeding mechanism out of gear when it is desired to travel without spreading manure.

Still another object is to provide an apparatus of this character, which will be durable, strong and efficient in use, unlikely to get out of order, and practical in construction.

With these and other objects in view, the invention consists in certain novel features of construction and combinations and arrangements of parts as will be more fully hereinafter described and pointed out in the claims.

In the accompanying drawings:—

Figure 1 is a view in side elevation of our improved remover and spreader with the parts in position for loading manure;

Figure 2 is a top plan view of Figure 1;

Figure 3 is a view in longitudinal section through the machine with the parts in position for spreading manure;

Figure 4 is a view in transverse section through one of the traction wheel axles and its associated parts;

Figure 5 is a fragmentary detail view illustrating the connection between one of the draw bars and one of the drag bars;

Figure 6 is a fragmentary edge view illustrating the manner of use of an attachment for loading sand or fine manure;

Figure 7 is a broken view in rear elevation of the attachment; and

Figure 8 is an enlarged sectional detail view on the line 8—8 of Figure 4.

Referring in detail to the drawings, 1 represents the boxlike body portion of our improved remover and spreader. The box is open at the top and is provided with an opening at the lower end of its front wall to accommodate a spreader cylinder 2. A lower gate 3 is hinged to the floor of the rear end of the box, as indicated at 4 and is adapted to swing downwardly and outwardly. An angle iron frame 5 is secured around the box and at its upper end serves to support a seat 6 for a driver and a foot platform 7.

Axle spindles 8 are secured to the sides of the frame 5 and upon these spindles are mounted traction wheels designated by the reference numeral 9 and provided with any suitable tread elements, designated by the reference numeral 10.

On the inner faces of the body portion, the metal of the body portion is indented to provide channel grooves such as 11. Draw bars 12 toothed throughout their length on their under faces are slidable in the grooves 11 and at their forward ends are rigidly connected to a tongue 13.

A transverse shaft 14 journaled in the draw bars 12 carries adjacent each end a pinion 15. 16, 16 represent a pair of drag bars which include a slotted portion toothed along the upper side of the slot as indicated at 17. The pinions 15 mesh with the teeth of the drag bars and may be locked to couple the draw bars 12 and drag bars 16 for simultaneous movement by throwing in a clutch 18, which is provided on the shaft 14. This clutch prevents rotary movement of the shaft 14 and pinions 15 and consequently independent movement of the draw bars and drag bars. The drag bars at their rear ends carry a fork or rake such as 19. The fork is pivoted to the drag bars, as indicated at 20 and is adjustable by means of perforated sectors 21 selectively engageable with securing devices 22 on the drag bars.

Outwardly presented rollers 23 are carried by the intermediate portions of the drag bars and are adapted to ride in tracks 24 secured to the inner faces of the box 1 adjacent the grooves 11. These tracks extend beyond the rear end of the box and are braced by suitable integral braces 25. Directly above the tracks 24, switches 26 are pivoted at their intermediate portions adjacent the rear end of the body upon pins or similar devices 27. These switches include curved and tapered forward ends such as 28 over which the rollers 23 are adapted to ride when the drag bars are moved rearwardly and also include upwardly and rearwardly presented rear ends 29 for a purpose which will hereinafter appear. The traction wheels 9 are attached to axle sleeves 30 which extend the entire length of the spindles 8 and are secured in place by suitable nuts 31 on the ends of the spindles. The sleeves 30 include a reduced portion 32 adjacent their inner ends and second sleeves 33 are journaled on the reduced portion 32 of the sleeves 30. A relatively large gear wheel 34 and a relatively small gear wheel 35 is carried by each sleeve 33. Spring held clutch elements 36 are slidably keyed to the sleeves 30, as indicated at 37. Expansion springs 38 between the clutch members and the walls of the box tend to force the members 36 outwardly and into engagement with the sleeves 33, or in other words, tend to keep the sleeves 33 and the sleeves 30 coupled for simultaneous movement.

The spreader cylinder 2 is journaled in the lower forward end of the box and sprocket wheels 39 located on the outer face of the box are fixed to turn with the spreader. Chains 40 connect the large gear wheels 34 and the sprocket wheels 39 so that when the clutches 37 are thrown in, turning of the traction wheels operates to turn the spreader cylinder 2. The spreader cylinder 2 is provided with a staggered arrangement of teeth 41. 42 designates an arcuate deflector which is carried by arms 43. The arms 43 are integral with trunnions 44 journaled in the sides of the box. An operating lever 45 carried by one of the trunnions is connected by a flexible device 46 to a windlass 47 mounted on the platform 7. Laterally extending brackets 48 secured adjacent the rear end of the box, provide mounting for dogs 49. These dogs are also connected by flexible devices 50 to the windlass 47 and are engageable with the tread members 10 of the traction wheels to prevent turning of the wheels.

The windlass 47 is also used to operate the rear gate 3 and a flexible device 51 connected to the gate is wrapped around the windlass. Suitable pulleys 52' are used to support the ropes and flexible devices 50 and 51. The flexible devices 46, 50 and 51 are so arranged upon the windlass that turning of a handle 52 to operate the windlass in one direction operates the dogs 49 to lock the wheels and simultaneously moves the deflector 42 into the position indicated in dotted lines in Figure 3, so that the weight of the manure when loading, is kept off the spreader cylinder 2. This operation of the windlass also allows the gate 3 to fall by gravity. Operation of the windlass in the other direction, closes the gate, releases the dogs 49 and allows the deflector 42 to fall by gravity to the position indicated in full lines in Figure 3. The deflector in this position permits free movement of the spreader cylinder 2 and prevents sticks and stones from being thrown upon the hoofs of the draft animals when the spreader cylinder is in motion. It will be apparent that by reference to Figure 3, that when the deflector 42 is pulled rearwardly, it engages the teeth 41 of the spreader cylinder 2 and prevents movement of the spreader cylinder as well as protecting the spreader cylinder from the weight of the manure.

A transverse shaft 53 is journaled in the forward end of the body or box 1. A pair of pinions 54 indicated in dotted lines in Figure 3, mesh with the teeth of the draw bars 12. On the outer ends of the shaft 53, sprocket wheels 55 are carried. Chains 56' connect the gear wheels 35 and one of the sprocket wheels 55. Either sprocket wheel may be used in accordance with the speed desired. Clutches 56 are interposed on the shaft 53 between the sprocket wheels and the box.

Any suitable means of braking the shaft 53 may be employed, such as the usual type of hand brake 57 controlled by a lever 58 and sector bars 59, the lever being connected to the brake through the medium of a suitable flexible device 60.

Upwardly presented striking irons 61 are carried by the rear ends of the drag bars 16. These striking irons are adapted to engage crank arms 62 on short vertical shafts 63 journaled in brackets 64 affixed to exterior faces of the box. At their lower ends, the shafts 63 each carry a swinging arm 64' fixed at its intermediate portion to one of the shafts. The arms 64' are formed at their ends with integral clutch forks 65 for operating the clutches 56 and 36. It will thus be seen that when the striking irons engage the crank arms 62, they will operate through the medium of the shafts 63 and arms 64' to throw out both of the clutches at each side of the box.

Brackets 66 secured to the body above the brackets 64 provide mounting for angular arms 67. The arms 67 are formed with slots 68 and pins 69, carried by the crank arms 62, are located in the slots 68 and serve to swing the arms 67 when the crank arms are engaged by the striking irons. Links 70 connect the ends of the arms 67 with the opposite ends of a lever 71 pivoted on the under face of the platform 7. This lever is operated by a crank shaft 72 journaled in a bracket 73 secured to the frame 5. The crank shaft 72 extends through the platform, as seen clearly in Figure 3. A ratchet wheel 74 fixed to the crank shaft above the platform cooperates with a dog 75 to lock the lever 71 in the desired position, thus controlling the position of the arms 64 through the medium of the mechanism above described. A crank arm 76 is provided for operating the shaft 72.

Any suitable number of whiffle-trees 77 may be attached to a yoke 78, which is secured to the tongue 13.

The operation of the apparatus is as follows:

Assuming that the box is empty and it is desired to load manure, the device is backed up to a pile of manure, as shown in Figure 1. The windlass 47 is operated to move the dogs 49 into locking engagement with the traction wheels to open the gate 3 and to move the protector 42 rearwardly to the position, indicated in dotted lines in Figure 3. The dog 75 is released, the crank arm 76 operated to throw out the clutches 56 and 36 so that the shaft 53 and pinions 54 are free to rotate without turning the sprocket wheels 55. The clutch 18 is thrown in, locking the pinions 15 and the drag bars 16 for simultaneous movement. The team is then backed, causing the rollers 23 to ride up over the switches 26, elevating the fork 19. As the rollers reach the ends of the switches, the fork will drop into the pile of manure, as indicated in dotted lines in Figure 1 and the rollers will drop on to the lower tracks 24. The team is then driven forwardly pulling the manure into the box. As the fork 19 moves forwardly pulling the manure into the box, the rollers 23 will ride under the forward end of the switches 26, the forward ends of the switches tilting upwardly as the rollers pass under them and falling by gravity when the rollers have passed. This operation may be repeated until the body or box is completely filled with manure. The clutch 18 is then released and the team is backed until the pinions 15 are at the rear end of the slots in the drag bars 16.

After this operation, the windlass 47 is operated to close the gate 3, release the brakes or dogs 49 and throw the protector 42 forwardly. The arm 76 is operated to again throw in the clutches 36 and 56 and throw the traction wheels into gear with the spreader cylinder 2 and the shaft 53; assuming that the manure is to be spread adjacent the place where it was loaded. As the team is driven ahead, turning of the traction wheels will operate through the chains 40 and 56" to turn the spreader cylinder 2 and the shaft 53. As the shaft 53 turns, the pinions 54 will also turn allowing the draw bars 12 to gradually slide forward out of the grooves 11, consequently pulling the fork 19 toward the forward end of the box the fork functioning as a follower and feeding the manure to the spreader cylinder. After the fork 19 has been pulled forwardly a predetermined distance, the striking irons 61 will engage the crank arms 62 operating through the medium of the shafts 63 and arms 64' to throw out the clutches 36 and 56. The engagement of the striking irons with the crank arms 62 will likewise operate through the arms 67 and links 70 to turn the lever 71 which will then be automatically locked by the ratchet wheel 74 and dog 75 so that the clutches are locked in inoperative position.

The parts will of course be so arranged that when the striking irons engage the crank arms 62, the manure will practically all have been dispensed from the box.

In driving with an empty box, the gears are of course thrown out so that a pull on the draw bars will not pull them out of the channels.

In Figures 6 and 7, we have illustrated an attachment which may be used for loading fine manure or sand. This attachment is in the form of a metal sheet 80, which is secured on the fork by means of trunnions 81 fitting into the sectors 21 and supported thereby. This attachment in no way affects the operation of the apparatus.

The exact proportions and shape of the box are of course immaterial to this invention and it will be apparent that while we have illustrated one of the preferred embodiments of our invention, a great many slight changes and alterations might be made in the general form and arrangement of the parts described without departing from the invention and hence we do not wish to limit ourselves to the precise details set forth, but shall consider ourselves at liberty to make such slight changes and alterations as fairly fall within the spirit and scope of the appended claims.

We claim;

1. In a machine of the class described, a wheeled manure receptacle, draft apparatus associated therewith, means for loading manure into said receptacle, and means connecting the draft apparatus and loading mechanism, whereby said loading mechanism is operated through force supplied to said draft apparatus.

2. In a machine of the character described, a receptacle for manure, traction wheels supporting said receptacle, draft apparatus associated with the receptacle, a loading fork adapted to load manure into one end of said receptacle, and means slidably mounted in the receptacle and coupled to the fork and draft apparatus, said means functioning through force applied to said apparatus to pull the fork forwardly at a predetermined speed.

3. In a machine of the class described, a receptacle for manure draft apparatus associated therewith, a loading fork, and means connecting said fork and draft apparatus for pulling the fork forwardly to positively feed manure towards one end of the receptacle.

4. In a machine of the class described, a receptacle for manure draft apparatus associated therewith, a loading fork, means connecting said fork and draft apparatus for pulling the fork forwardly by said draft apparatus to positively feed manure towards one end of the receptacle, and stops limiting the forward movement of the fork.

5. In a machine of the character described, a receptacle for manure, traction wheels supporting said receptacle draw bars, drag bars pivotally connected to the draw bars, a loading fork carried by the drag bars, and means whereby rearward movement of the draw bars throw the fork upwardly and rearwardly and drops the same.

6. In a machine of the character described, a receptacle for manure, traction wheels supporting said receptacle, draw bars, drag bars pivotally connected to the draw bars, a loading fork carried by the drag bars, and means whereby rearward movement of the draw bars throws the fork upwardly and rearwardly and drops the same, said means including inclined tracks, rollers on the drag bars riding on the tracks, and means for coupling the drag bars and draw bars for movement in either direction.

7. In a machine of the character described, an open topped receptacle for manure, traction wheels supporting said receptacle, draw bars mounted to slide in the receptacle, means for controlling and limiting the sliding movement of the draw bars, drag bars slidably and pivotally connected to the draw bars, and a fork carried by the drag bars, means for throwing said fork rearwardly and upwardly to fall upon a pile of manure, means for pulling said fork forwardly to positively feed manure to the spreader.

8. In a machine of the character described, a receptacle for manure, traction wheels supporting said receptacle, draw bars mounted to slide in the receptacle, means for controlling the sliding movement of the draw bars, a loading and feeding fork connected to the draw bars, and adapted to positively feed manure towards one end of the receptacle, said controlling means being geared to the traction wheels and means for automatically throwing the same out of gear when the fork has reached a predetermined position.

9. In a machine of the character described, a receptacle for manure, traction wheels supporting said receptacle, draw bars mounted to slide in the receptacle, means for controlling the sliding movement of the draw bars, a loading and feeding fork connected to the draw bars, and adapted to positively feed manure towards one end of the receptacle, said controlling means being geared to the traction wheels and means for automatically throwing the same out of gear when the fork has reached a predetermined position, said means including clutches, striking irons actuated by the draw bars, and means engageable with the striking irons for throwing out the clutches.

10. In a machine of the character described, a receptacle for manure, traction wheels supporting said receptacle, draw bars mounted to slide in the receptacle, means for controlling the sliding movement of the draw bars, a fork connected to the draw bars, and adapted to positively feed manure towards one end of the receptacle, said controlling means being geared to the traction wheels, and means for automatically throwing the same out of gear when the fork has reached a predetermined position, said means including clutches, striking irons actuated by the draw bars, and means engageable with the striking irons for throwing out the clutches, and automatically locking them in inoperative position.

11. In a machine of the character described, a boxlike body portion supported on traction wheels, toothed draw bars slidable in said body portion, pinions actuated by the sliding movement of the draw bars, means associated with the pinions for controlling the sliding movement of the draw bars, a loading fork actuated by the draw bars and positively feeding manure towards one end of the receptacle.

12. In a machine of the character described, a boxlike body portion supported on traction wheels, toothed draw bars slidable in said body portion, pinions actuated by the sliding movement of the draw bars, means associated with the pinions for controlling the sliding movement of the draw bars, a loading fork actuated by the draw bars and positively feeding manure towards one end of the receptacle and means for locking the traction wheels against movement during the loading operation.

13. In a machine of the class described, a receptacle for manure, draft apparatus associated therewith, a loading fork, means connecting the fork and draft apparatus and means for throwing the fork upwardly and rearwardly and dropping the same when the pull on said draft apparatus is reversed.

14. In a machine of the character described, a receptacle for manure, a loading fork, means for throwing the fork upwardly and rearwardly and dropping the same, said means including stationary tracks, angular tilting tracks pivoted thereabove, and means associated with the forks riding on the tracks.

15. In a machine of the character described, a receptacle for manure, a loading fork, means for throwing the fork upwardly and rearwardly and dropping the same, said means including stationary tracks, angular tilting tracks pivoted thereupon, means associated with the fork riding on the tracks, and means for pulling the fork forwardly to feed manure towards one end of the receptacle.

16. In a machine of the class described, a receptacle for manure, draft apparatus associated therewith, traction wheels supporting said receptacle, single means operatively connected to said draft apparatus for pulling manure into one end of the receptacle, and positively feeding the same towards the other end of the receptacle.

17. In a machine of the class described, a receptacle for manure, means for positively feeding manure towards one end of the receptacle, and means for controlling the speed of operation of said feeding means, and means for automatically stopping said feeding means after a predetermined amount of manure has been fed.

18. A device of the character set forth in claim 5, and including means for adjusting the angle of the fork relative to the drag bars.

19. A device of the character set forth in claim 5, and including adjustable sector bars adapted to be locked in various positions to control the angle of the fork relative to the drag bars.

20. A device of the character described in claim 6, and in which said drag bars have toothed slots therein, a shaft journaled between the draw bars, and in which the means for coupling the drag bars and draw bars includes pinions fixed to the shaft and meshing with the teeth of the drag bars, and means for locking said shaft against rotation.

HERBERT CARSWELL WRIGHT.
WILLIAM JOHN WRIGHT.